United States Patent
Giagnoli et al.

(10) Patent No.: US 7,168,449 B2
(45) Date of Patent: Jan. 30, 2007

(54) QUICK COUPLING FOR HYDRAULIC FLUID PIPES

(75) Inventors: Sylvain Giagnoli, Ambilly (FR); Richard Rolli, Bonneville (FR)

(73) Assignee: Parker Hannifin SA, Annemasse (FR)

( * ) Notice: Subject to any disclaimer, the term of this patent is extended or adjusted under 35 U.S.C. 154(b) by 0 days.

(21) Appl. No.: 10/557,147

(22) PCT Filed: May 19, 2004

(86) PCT No.: PCT/FR2004/001245

§ 371 (c)(1),
(2), (4) Date: Feb. 17, 2006

(87) PCT Pub. No.: WO2004/104467

PCT Pub. Date: Dec. 2, 2004

(65) Prior Publication Data

US 2006/0151032 A1 Jul. 13, 2006

(30) Foreign Application Priority Data

May 20, 2003 (FR) .................................. 03 06057

(51) Int. Cl.
*F16L 37/35* (2006.01)
*F16L 37/32* (2006.01)
(52) U.S. Cl. .................... 137/614.04; 137/614.05

(58) Field of Classification Search ............ 251/149.6; 137/614.04, 614.05, 614.06, 614.03
See application file for complete search history.

(56) References Cited

U.S. PATENT DOCUMENTS

| 4,388,947 | A | * | 6/1983 | Steuerwald | 137/614.06 |
| 4,664,148 | A | * | 5/1987 | Magnuson | 137/614.05 |
| 4,974,635 | A | * | 12/1990 | Hanus et al. | 137/614.05 |
| 5,967,491 | A | * | 10/1999 | Magnuson et al. | 137/614.05 |

FOREIGN PATENT DOCUMENTS

| DE | 37 13 284 A1 | 11/1988 |
| DE | 39 42 618 A1 | 6/1991 |
| FR | 2 738 896 | 3/1997 |

* cited by examiner

*Primary Examiner*—John Bastianelli
(74) *Attorney, Agent, or Firm*—Oliff & Berridge, PLC

(57) ABSTRACT

The invention relates to a quick-connect coupling for hydraulic fluid conduits. The inventive coupling consists of a male element and a female element comprising an outer tubular part and a mobile coupling part. In addition, joints are provided between the tubular parts and define chambers. According to the invention, during the coupling phase, one hydraulically-pressurised chamber can be communicated with an atmospheric pressure chamber, using at least one longitudinal groove or similar element which is disposed in the tubular coupling part or in the outer tubular part.

9 Claims, 3 Drawing Sheets

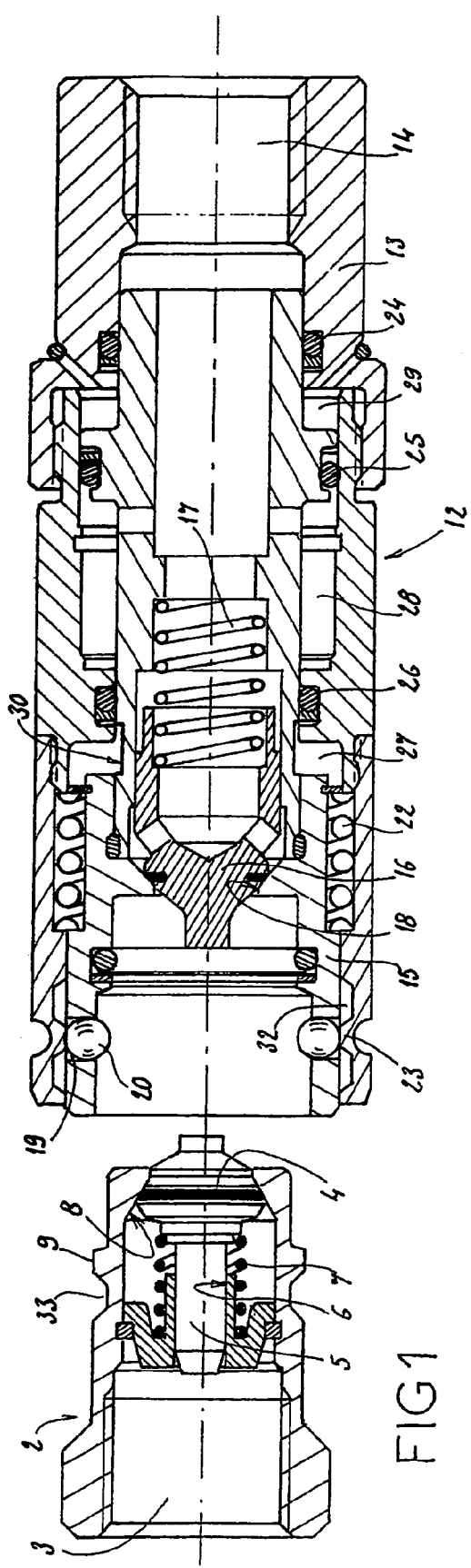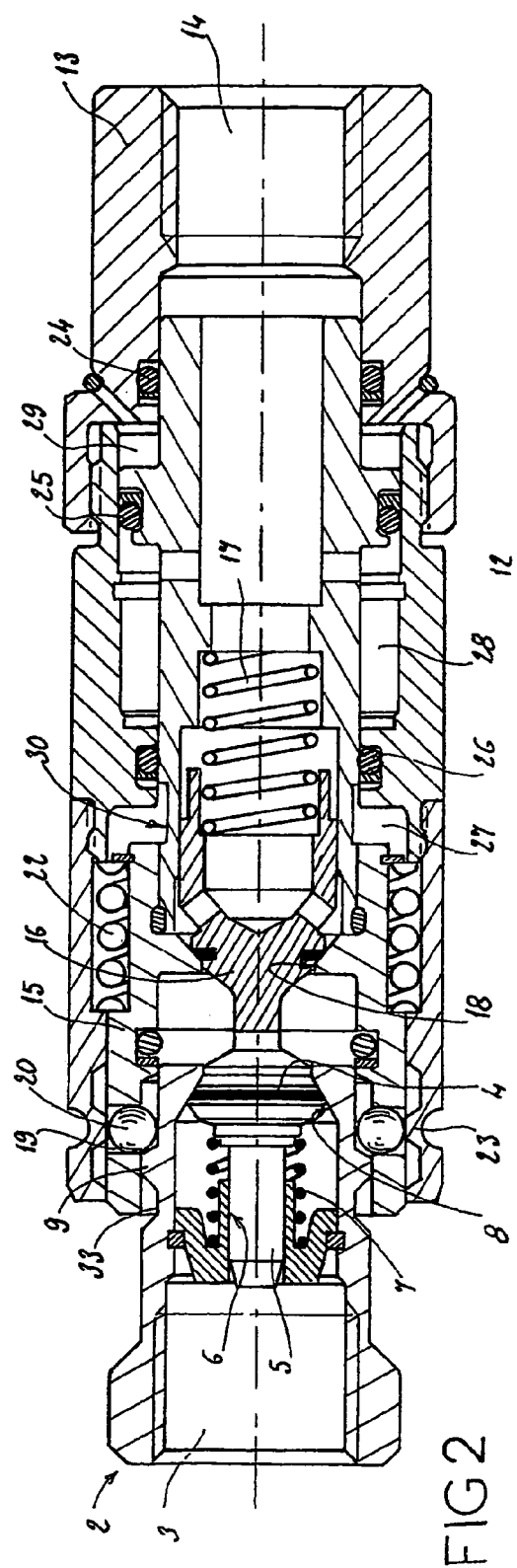
FIG 1
FIG 2

QUICK COUPLING FOR HYDRAULIC FLUID PIPES

BACKGROUND OF THE INVENTION AND DESCRIPTION OF THE PRIOR ART

The subject of the present invention is a quick coupling for hydraulic fluid pipes. Such a quick coupling for hydraulic fluid pipes is known particularly from document EP-0 847 511 in the name of the Applicant.

Such a hydraulic coupling comprises, in a manner known per se, a male element and a female element whose ends which are to be connected are closed by valves, each valve comprising a shut-off member which comes into bearing contact with the shut-off member of the other valve upon connection, each shut-off member being pressed elastically against a seat in the open position of the coupling, the female element comprising an outer tubular part fastened to the end of a pipe or to a hydraulic receiver and inside which is slidably mounted a tubular coupling part for coupling the male part, which itself contains a valve, the tubular coupling part being slidably mounted in the outer part, in an insertion direction, against the action of elastic means, seals being provided between the two tubular parts and delimiting annular chambers, at least one of which is at the hydraulic pressure of the pipe or of the receiver to which the female element is fastened.

The problem which arises is that during the coupling phase, in the course of which the moving coupling part enters the outer tubular part, the pressure existing on the female part side, inside a pipe or inside the receiver, tends to oppose the connection.

SUMMARY OF THE INVENTION

The object of the present invention is therefore to provide an arrangement making possible this connection, allowing the tubular coupling part to move with respect to the outer tubular part, even in the presence of a hydraulic pressure inside the female connection element.

To this end, in the coupling to which the invention relates the tubular coupling part comprises, in the region of a seal delimiting a chamber under hydraulic pressure and a chamber at atmospheric pressure, at least one longitudinal slot or the like formed in at least one of the tubular parts and positioned in such a way as to bring a chamber under hydraulic pressure into communication with an annular chamber at atmospheric pressure during the coupling phase, that is to say when the tubular coupling part is in the inserted position in the outer tubular part, and does not allow such a communication when the female element is in the coupled position or in the uncoupled position.

Consequently, when the moving coupling part is inserted into the outer tubular part of the female element, the seal separating the chamber in which a hydraulic pressure prevails from the chamber at atmospheric pressure will be situated opposite at least one slot, making it possible to remove the compressive force exerted by the seal and allowing hydraulic liquid to escape toward the chamber at atmospheric pressure. With the pressure in the female element thus having dropped, the male element will be able to be locked and the moving coupling part will return to its initial position in which sealing is reinstated.

According to a first embodiment, the tubular coupling part comprises, in the region of a seal delimiting the annular chamber at hydraulic pressure and an annular chamber at atmospheric pressure, at least one longitudinal slot positioned in such a way as to bring the annular chamber at hydraulic pressure into communication with the annular chamber at atmospheric pressure during the coupling phase, that is to say when the tubular coupling part is in the inserted position in the outer tubular part, and does not allow such a communication when the female element is in the coupled position or in the uncoupled position.

According to a second embodiment, the tubular coupling part comprises, in the region of a seal, a longitudinal slot or the like positioned in such a way as to bring the annular chamber at hydraulic pressure into communication with the annular chamber at atmospheric pressure during the coupling phase.

According to a third embodiment, the tubular coupling part comprises, in the region of a seal, a longitudinal slot or the like positioned in such a way as to bring the interior of the tubular part of the female part into communication with the annular chamber at atmospheric pressure during the coupling phase.

The longitudinal slot or slots may be obtained by known techniques, such as milling, or machining, such as turning, grinding, cutting and stamping.

Advantageously, the cross section of at least one longitudinal slot increases from the end thereof situated in the direction of the chamber under hydraulic pressure toward its end situated in the direction of the chamber at atmospheric pressure.

This arrangement makes it possible to bring the chamber subjected to hydraulic pressure into progressive communication with the chamber subjected to atmospheric pressure.

Furthermore, the means for bringing about communication between a chamber under pressure and a chamber at atmospheric pressure consist of machined and/or drilled features formed in the outer tubular part and/or in the tubular coupling part.

BRIEF DESCRIPTION OF THE DRAWINGS

In any case, the invention will be better understood with the aid of the following description, with reference to the appended schematic drawing showing, by way of nonlimiting example, several embodiments of this coupling.

FIG. 1 is a view in longitudinal section of the male element and the female element in the uncoupled position.

FIGS. 2 to 4 are three views in longitudinal section at the start of the male element being inserted into the female element, during the coupling phase, and after coupling, respectively.

DESCRIPTION OF THE PREFERRED EMBODIMENTS

Figure 3:
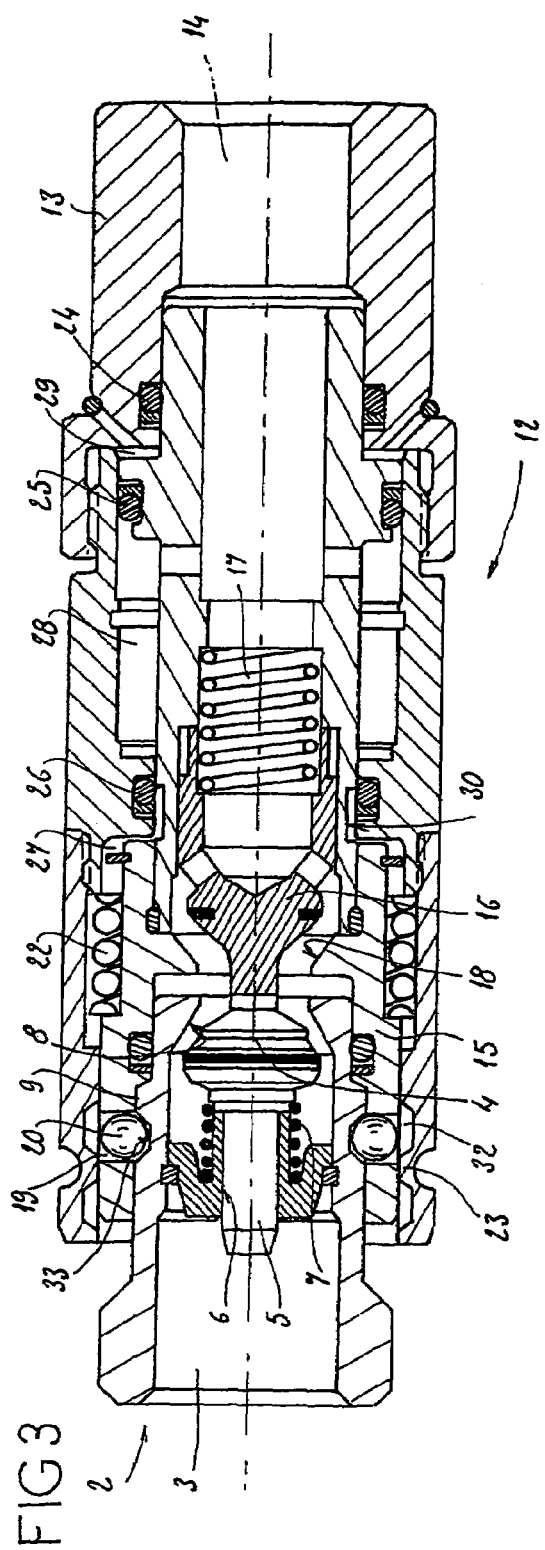
Figure 4:
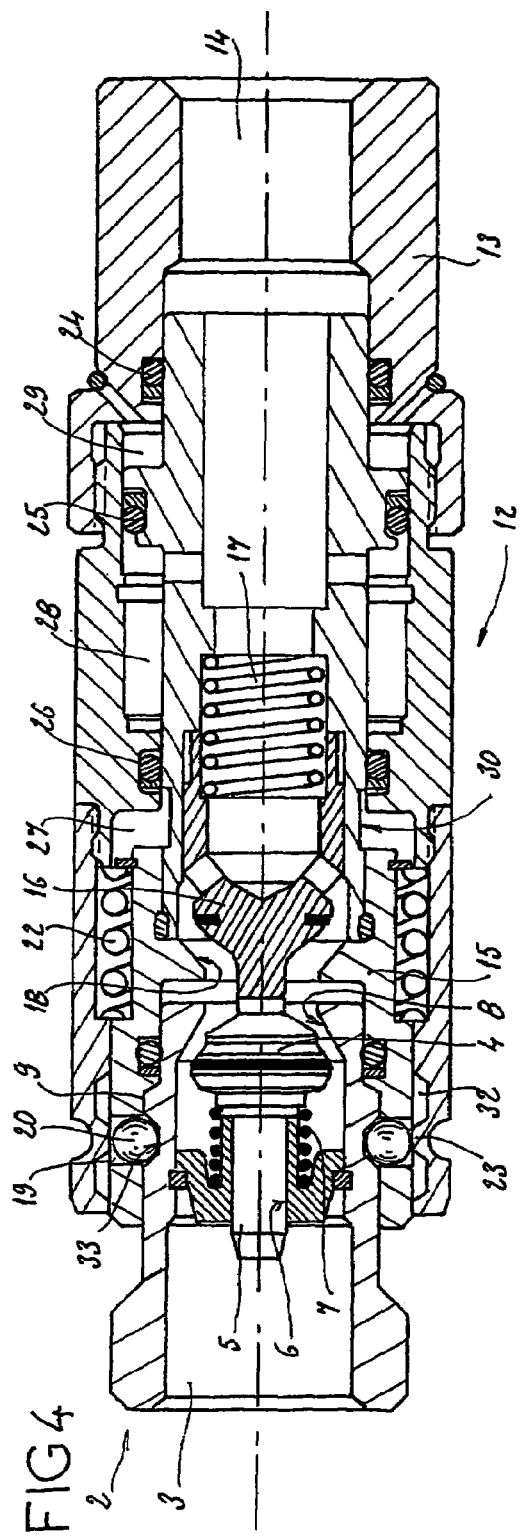

FIG. 1 represents the coupling in the uncoupled position.

This coupling comprises a male element 2 which can be fastened, for example to a flexible pipe, by screwing with the aid of a thread 3.

The male element 2 comprises, at its front end, a shut-off element 4 whose rear wall comprises a stem 5 slidably mounted in a cylinder 6 fastened in the male element. A spring 7 arranged between the lower part of the cylinder and the head of the shut-off member 4 normally keeps said head in a sealed closed position against a seat 8. The male element comprises an annular shoulder 9 in the vicinity of its front end.

This coupling also comprises a female element 12 formed by an outer tubular part 13 whose rear end has a thread 14 for mounting it on a pipe or on a receiver. A moving coupling part 15, which is able to slide in the outer part 13, is mounted inside the outer tubular part.

A shut-off member 16, subjected to the action of a spring 17 which keeps it pressed fluid-tight against a seat 18, is slidably mounted inside the moving coupling part 15.

The moving coupling part 15 comprises, in the vicinity of its front end, cutouts 19 serving to accommodate balls 20. A spring 22 keeps the part 15 in the position represented in FIGS. 1 and 2, in which position the balls 20 are held in a projecting manner toward the inside of the inner wall of the moving part 15 by bearing on an annular boss 23 belonging to the outer tubular part 13. The moving coupling part 15 is slidably mounted in the outer part 13, with interposition of three O-ring seals 24, 25 and 26, respectively. The chamber 27 containing the spring 22 is at atmospheric pressure. The chamber 28 arranged between the seals 25 and 26 is at the hydraulic pressure of the receiver on which the female element 12 is mounted. The chamber 29 arranged between the seals 24 and 25 is at atmospheric pressure. As shown in the drawing, there is provided at least one longitudinal slot 30 formed in the outer wall of the moving coupling part 15, in the region situated between the chamber 27 at atmospheric pressure and the O-ring seal 26. As shown in the drawing, each slot 30 is situated between the chamber 27 and the seal 26 when the moving coupling part 15 is in the uncoupled position or in the coupled position, each slot moving past the O-ring seal 26 during the coupling phase.

The way in which this quick coupling is used is as follows.

Starting from the position represented in FIG. 1, the male element 2 is positioned and inserted into the moving coupling part of the female element 12. During this movement, and as shown in FIG. 2, the shoulder 9 of the female element bears against the locking balls 20, causing a movement of the moving coupling part 15 in the tubular outer part 13, in a direction of insertion into the latter. During this movement, the locking balls 20 are retracted into an annular groove 32 in the tubular outer part, enabling the shoulder 9 to pass behind the balls 20, which then enter an annular groove 33 in the male element. During this movement, the longitudinal slots 30 of the moving coupling part 15 become positioned under the O-ring seal 26, and will remove the compressive force exerted by the seal and allow hydraulic liquid to escape from the chamber 28. With the pressure in the coupler thus having dropped, locking can be performed by the balls and the moving coupling part 15 can return to its initial position, under the relaxation effect of the spring 22, the balls being immobilized radially once more in the groove 33 in the male element by the shoulder 23.

It is to be noted that the pipe to which the male element is fastened and the receiver are brought into communication by opening the valves belonging to the male 2 and female 12 elements by means of the respective shut-off members 4, 16 bearing one against the other.

It should be noted that the number of slots 30 is at least one and that the cross section of each slot may vary, increasing from its end situated in the direction of the chamber in which the hydraulic pressure prevails toward its end situated in the direction of the chamber at atmospheric pressure.

Figure 5:
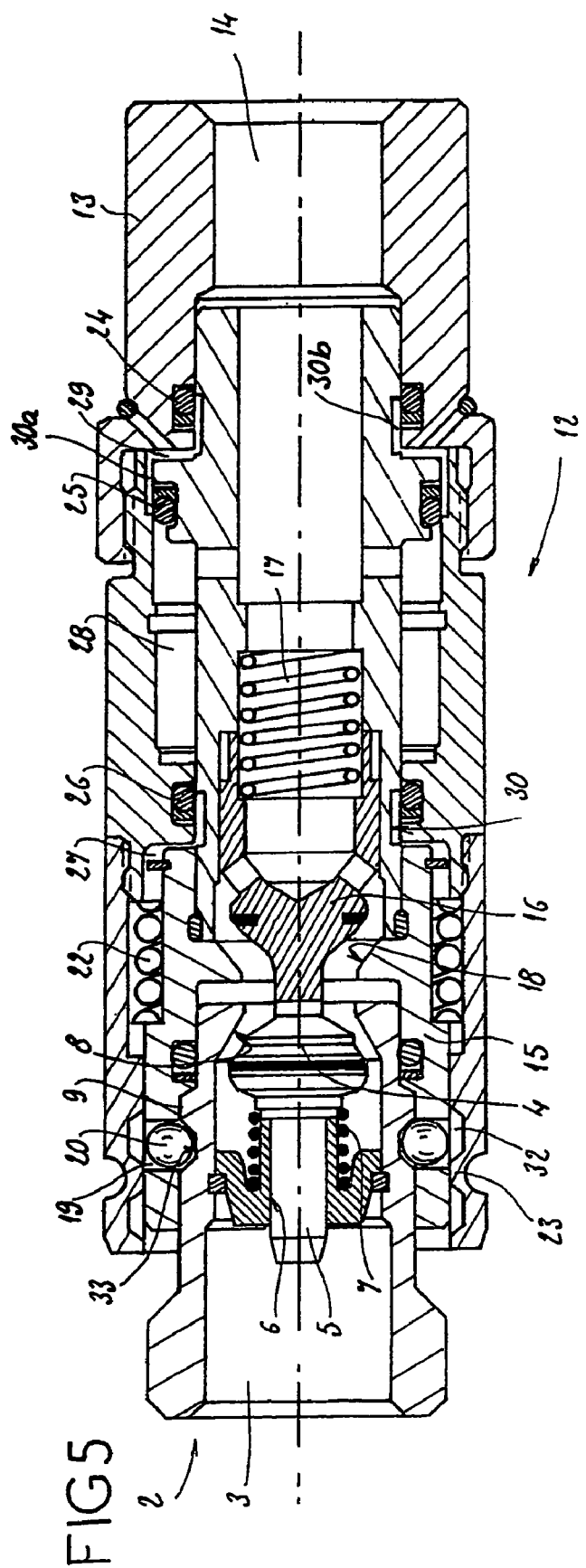
FIG. 5 is a view in longitudinal section representing a number of embodiments for bringing a chamber under pressure into communication with a chamber at atmospheric pressure.

FIG. 5 represents a number of embodiments of a coupling according to the invention. Apart from the slot 30 associated with the seal 26, this figure also shows a slot 30a, associated with the seal 25, capable of bringing the chamber 28 at hydraulic pressure into communication with the chamber 29 at atmospheric pressure, and a slot 30b, associated with the seal 24, capable of bringing the interior of the tubular part at hydraulic pressure into communication with the chamber 29 at atmospheric pressure.

These various solutions may be implemented separately or in a combined manner, either wholly or in part.

As emerges from the foregoing, the invention affords a major improvement to the existing art by providing a coupler which, by virtue of a simple design, makes it possible to produce a connection, including when the female coupling element is subjected to a hydraulic pressure.

The invention claimed is:

1. A quick coupling for hydraulic fluid pipes, comprising:
   a male element and a female element whose ends which are to be connected are closed by first and second valves, respectively,
   each valve comprising a shut-off member which comes into bearing contact with the shut-off member of the other valve upon connection, each shut-off member being pressed by resilient means against a seat while the male element and female element are uncoupled,
   the female element comprising an outer tubular part fastened to the end of a pipe or to a hydraulic receiver and inside which is slidably mounted a tubular coupling part for coupling the male part, the tubular coupling part being slidably mounted in the outer part, in an insertion direction, against the action of coupling resilient means, seals being provided between the two tubular parts and delimiting annular chambers,
   wherein the tubular coupling part comprises the second valve and, in the region of a seal delimiting one of the annular chambers pressurized at the hydraulic pressure of the pipe or of the receiver to which the female element is fastened and one of the annular chambers pressurized at atmospheric pressure, at least one longitudinal slot formed in at least one of the tubular parts and positioned in such a way as to bring the annular chamber under hydraulic pressure into communication with the annular chamber at atmospheric pressure during the coupling phase, when the tubular coupling part is in the inserted position in the outer tubular part, and does not allow such a communication when the female element is in the coupled position or in the uncoupled position.

2. The coupling as claimed in claim 1, wherein the tubular coupling part comprises, in the region of a seal, a longitudinal slot positioned in such a way as to bring the annular chamber at hydraulic pressure into communication with the annular chamber at atmospheric pressure during the coupling phase.

3. The coupling as claimed in claim 1, wherein the tubular coupling part comprises, in the region of a seal, a longitudinal slot positioned in such a way as to bring the interior of the outer tubular part of the female element into communication with the annular chamber at atmospheric pressure during the coupling phase.

4. The coupling as claimed in claim 1, wherein the cross section of at least one longitudinal slot increases from the end thereof situated in the direction of the annular chamber under hydraulic pressure toward its end situated in the direction of the annular chamber at atmospheric pressure.

5. The coupling as claimed in claim 1, wherein the means for bringing about communication between the annular chamber under pressure and the chamber at atmospheric pressure consists of machined and/or drilled features formed in the outer tubular part and/or in the tubular coupling part.

6. The coupling as claimed in claim 2, wherein the cross section of at least one longitudinal slot increases from the end thereof situated in the direction of the annular chamber under hydraulic pressure toward its end situated in the direction of the annular chamber at atmospheric pressure.

7. The coupling as claimed in claim 3, wherein the cross section of at least one longitudinal slot increases from the end thereof situated in the direction of the annular chamber under hydraulic pressure toward its end situated in the direction of the annular chamber at atmospheric pressure.

8. The coupling as claimed in claim 2, wherein the means for bringing about communication between the annular chamber under pressure and the chamber at atmospheric pressure consists of machined and/or drilled features formed in the outer tubular part and/or in the tubular coupling part.

9. The coupling as claimed in claim 3, wherein the means for bringing about communication between the annular chamber under pressure and the chamber at atmospheric pressure consists of machined and/or drilled features formed in the outer tubular part and/or in the tubular coupling part.

* * * * *